United States Patent [19]
Brown

[11] Patent Number: 5,949,327
[45] Date of Patent: Sep. 7, 1999

[54] COUPLING OF TELECOMMUNICATIONS SIGNALS TO A BALANCED POWER DISTRIBUTION NETWORK

[75] Inventor: Paul A. Brown, Kendal, United Kingdom

[73] Assignee: Norweb PLC, United Kingdom

[21] Appl. No.: 08/793,189

[22] PCT Filed: Aug. 25, 1995

[86] PCT No.: PCT/GB95/02023

§ 371 Date: Feb. 21, 1997

§ 102(e) Date: Feb. 21, 1997

[87] PCT Pub. No.: WO96/07245

PCT Pub. Date: Mar. 7, 1996

[30] Foreign Application Priority Data

Aug. 26, 1994 [GB] United Kingdom .................. 9417359

[51] Int. Cl.⁶ .............................................. H04M 11/04
[52] U.S. Cl. ............................. 340/310.01; 340/310.05; 340/310.06; 340/310.07; 455/3.3; 375/258
[58] Field of Search ................. 340/310.01, 310.05, 340/310.02, 310.06, 310.07; 455/3.3, 3.1, 280; 375/257, 258, 259; 307/104

[56] References Cited

U.S. PATENT DOCUMENTS

| | | |
|---|---|---|
| 1,547,242 | 7/1925 | Strieby . |
| 2,577,731 | 12/1951 | Berger . |
| 3,696,383 | 10/1972 | Oishi et al. ...................... 340/310.07 |
| 3,846,638 | 11/1974 | Wetherell ................................... 307/3 |
| 3,942,170 | 3/1976 | Whyte ................................ 340/310 A |
| 3,993,989 | 11/1976 | Held et al. ........................ 340/310 R |

(List continued on next page.)

FOREIGN PATENT DOCUMENTS

| | | | |
|---|---|---|---|
| 0141673 | 5/1985 | European Pat. Off. ......... H04B 3/56 |
| 2326087 | 4/1977 | France ............................ H04B 3/54 |
| 1548652 | 7/1979 | United Kingdom ............. H04B 3/54 |
| 2101857 | 1/1993 | United Kingdom ............. H04B 3/56 |
| 2272350 | 5/1994 | United Kingdom ............. H04B 3/56 |
| WO84/01481 | 4/1984 | WIPO .............................. H04B 3/54 |
| WO90/13950 | 11/1990 | WIPO .............................. H04B 1/50 |
| WO92/16920 | 10/1992 | WIPO .............................. H04B 3/54 |
| WO93/07693 | 4/1993 | WIPO ............................. H04J 13/00 |
| WO93/23928 | 11/1993 | WIPO .............................. H04B 1/38 |
| WO94/09572 | 4/1994 | WIPO .............................. H04B 3/54 |

OTHER PUBLICATIONS

J. Gohari, "Power–Line Carrier," *Fundamentals Handbook of Electrical and Computer Engineering, vol. II, Communication, Control. Devices, and Systems*, (Sheldon S. L. Chang, editor), John Wiley & Sons, New York, 1983, pp. 617–627.

*The ARRL Handbook For Radio Ameteurs*, American Radio Relay League, Newington, CT 06111, United States, 1993, pp. 16–1 to 16–15.

Keith Nichols, "Build a Pair of Line–Carrier Modems," *Radio Electronics*, pp. 87–91, (July 1988).

*Primary Examiner*—Jeffery A. Hofsass
*Assistant Examiner*—Anh La
*Attorney, Agent, or Firm*—Arnold White & Durkee

[57] ABSTRACT

The present invention provides an overhead balanced electricity distribution and/or power transmission network (1201), the network including input means (1301) for the input onto the network of a telecommunications signal having a carrier frequency greater than approximately 1 MHz from an unbalanced source and output means (1301) for removing said telecommunications signal from the network, wherein said input means and said output means provide impedance matching between said network and said source. Thus, propagation of HF communication signals over such networks is optimised, and the input and output means ("conditioning units") provide for interconnection between a source e.g. a relatively low impedance unbalanced HF (possibly coaxial) termination and a high impedance balanced OH EDN, and provide efficient unbalanced to balanced impedance transformation and termination.

21 Claims, 13 Drawing Sheets

U.S. PATENT DOCUMENTS

| | | | |
|---|---|---|---|
| 4,142,178 | 2/1979 | Whyte et al. | 340/310 R |
| 4,359,644 | 11/1982 | Foord | 307/40 |
| 4,367,522 | 1/1983 | Forstbauer et al. | 363/137 |
| 4,383,243 | 5/1983 | Krügel et al. | 340/310 |
| 4,409,542 | 10/1983 | Becker et al. | 324/57 |
| 4,419,621 | 12/1983 | Becker et al. | 324/51 |
| 4,471,399 | 9/1984 | Udren | 340/310.05 |
| 4,475,209 | 10/1984 | Udren | 375/4 |
| 4,479,033 | 10/1984 | Brown et al. | 179/2.51 |
| 4,517,548 | 5/1985 | Ise et al. | 340/310.07 |
| 4,686,382 | 8/1987 | Shuey | 340/310.07 |
| 4,701,945 | 10/1987 | Pedigo | 379/66 |
| 4,766,414 | 8/1988 | Shuey | 340/310 A |
| 4,772,870 | 9/1988 | Reyes | 340/310 |
| 4,912,553 | 3/1990 | Pal et al. | 358/86 |
| 5,066,939 | 11/1991 | Mansfield | 340/310 R |
| 5,068,890 | 11/1991 | Nilssen | 379/90 |
| 5,148,144 | 9/1992 | Sutterlin et al. | 340/310 A |
| 5,319,634 | 6/1994 | Bartholomew et al. | 370/18 |
| 5,406,249 | 4/1995 | Pettus | 340/310.07 |
| 5,477,091 | 12/1995 | Fiorina et al. | 307/66 |
| 5,497,142 | 3/1996 | Chaffanjon | 340/310.06 |
| 5,559,377 | 9/1996 | Abraham | 342/310.07 |
| 5,684,450 | 11/1997 | Brown | 340/310.02 |
| 5,705,974 | 1/1998 | Patel et al. | 340/310.01 |
| 5,717,685 | 2/1998 | Abraham | 370/30 |

OTHER PUBLICATIONS

Informal English translation of French Application No. 7621599 corresponding to French Patent 2,326,087 (Zellweger Uster S.A.).

J. R. Formby and R. N. Adams, "The Mains Network As A High Frequency Signalling Medium," The Electricity Council, Great Britain, Jan. 1970.

J. M. Barstow, "A Carrier Telephone System for Rural Service," AIEE Transactions, vol. 66, 1947, New York, NY, pp. 501–507.

I. C. Vercellotti & I. A. White, "Distribution Power Line Communications for Remote Meter Reading and Selective Load Control," Proceedings of the American Power Conference 1974, vol. 36, pp. 1114–1119.

B. Ron Russell, editor, "Communication Alternatives for Distribution Metering and Load Management," Record of Panel Presentations, 1979 Summer Power Meetings, IEEE Transactions on Power Apparatus and Systems, vol. PAS–99, No. 4, Jul./Aug. 1980, IEEE, New York, NY, pp. 1448–1455.

Glen Lokken et al., "The Proposed Wisconsin Electric Power Company Load Management System," 1976 Nat. Telecomm. Conf., Dallas, Texas, Nov. 1976, IEEE, New York, NY, pp. 2.2–1 to 2.2–3.

J. H. Bull et al., "A Survey of Mains Signalling Within the UK," ERA Report No. 86–0038, ERA Technology Limited, Surrey, England, Apr. 1986, pp. 1–52, AA.2–AA.5, FIGS. 1–33, Table 1.

British Standards, "Signalling on low–voltage electrical installations in the frequency range 3KHz to 148.5KHz," BS EN 50065–1, 1992 (2 pages); Electromagnetic compatibility—Generic emission standard, BS EN 50081–1 (2 pages); "Telecontrol equipment and systems," BX 7407 (870–1–1) (1 page).

Draft standard, "Signalling on Low–Voltage Electrical Installations in the Frequency Band 3kKz to 148.5 kHz, Part 4: Filters at the interface of the indoor and outdoor electricity network," EN 50 065–4 Apr. 1992 (11 pages).

Draft standard, Signalling on Low–Voltage Electrical Installations in the Frequency Bank 3kKz to 148.5 kHz, Part 7: Equipment Impedance, EN 50 065–7 Apr. 1992 (3 pages).

"Coaxial Feeder Cables," Engineering Notes, Publication Ref. No. TSP507/1, Pye Telecommunications Limited, Cambridge, England, Jun. 1975, pp. 1–13.

JP62120735, Patent Abstracts of Japan, vol. 11, No. 341 (E–554) Jun. 2, 1987, Kaoruet al., Method and Apparatus for Frequency Hopping Stread Spectrum Power Line Carrier Communication, 1 page.

JP62030428, Patent Abstracts of Japan, vol. 11, No. 209 (E–521) Feb. 9, 1987, Kondo Tomio, Current Superposition Type High Frequency Circuit, 1 page.

JP1276933, Patent Abstracts of Japan, vol. 14, No. 51 (E–0881) Jan. 30, 1990, Uchida Hiroshi, Transformer Bypass Circuit, 1 page.

COUPLING OF TELECOMMUNICATIONS SIGNALS TO A BALANCED POWER DISTRIBUTION NETWORK

BACKGROUND OF THE INVENTION

This invention relates to a method of signal injection, transmission, interconnection (termination) and detection, and to a power transmission network, ie. a mains electricity distribution and/or transmission network, and a filter therefor. In particular it relates to the use of overhead mains electricity networks and/or lines for telecommunications transmission (e.g. voice, data, image and/or video).

BACKGROUND ART

In the UK, it is conventional to describe a power network for 33 kV and above as a "transmission network", and one for less than 33 kV as a "distribution network". In this specification the term "electricity distribution and/or power transmission network" (EDN) is normally used, but general references to power networks and to transmission of signals are to be construed as applying to all such networks.

Traditionally telecommunications signals have been transmitted on independent networks e.g. telephone lines. More recently, in order to simplify and increase efficiency of telecommunications services to domestic or industrial premises, there have been investigations into using existing electricity transmission and distribution networks to carry telecommunications services.

It has been known to utilise above ground (overhead) (OH) power lines for the transmission of additional control, speech and data signals. However, with such transmissions, in the past the frequency spectrum has been allocated for and restricted to particular applications in order to avoid interference with other telecommunications services. In addition, the strength of signals which could be transmitted was generally thought to be limited since the amount of radiation produced by the transmission is related to the strength of the signal and this radiation must be kept to a minimum.

Such transmission signals have therefore been of low power and confined within a specific frequency band allocated by international agreement for such purposes, so this mechanism has been thought to be unsuitable for large scale voice and/or data transmission where signals extend well into the radio spectrum (e.g. 150 kHz and above).

Furthermore, if signals are to be transmitted on overhead power networks then other problems need to be overcome, such as the problems of noise on the networks, varying customer loads attached to the network, and impedance matching between communications equipment attached to the network and the network itself.

It has been known to use spread spectrum techniques to transmit data at carrier frequencies of between 6 kHz and 148 kHz on underground (UG) and overhead (OH) EDN's. Again, in this allocated frequency band such transmissions suffer from low data rates and low traffic capacities due to power line noise characteristics. Due to the limited spectrum available and high noise levels encountered wideband telecommunications signals have not been sent.

Although papers such as that by J. R. Formby and R. N. Adams, ("The mains network as a high frequency signalling medium", The Electricity Council, January 1970) suggested a communications potential for the low and medium voltage networks, no further work was undertaken. Even today, with the prospect of remote meter reading and selective load control, solutions tend to employ techniques such as telephony and radio communications, thus avoiding the mains network where possible.

Ideas have been put forward but few have proceeded past the theoretical stage, due to the hostile environment presented by the mains network. The problems to be overcome include electrical noise, (both constant background noise and transient spikes) and high attenuation of high frequency signals due to skin and proximity effects.

Messrs Formby and Adams suggested using frequencies in the range of 80 to 100 kHz. 100 kHz was recommended as a maximum because theory suggested that higher frequencies would suffer from excessive attenuation. Other papers recommend a maximum of 150 kHz due to the fact that radiated signals higher than 150 kHz would interfere with broadcast radio signals.

A further situation where power lines are also used for the transmission of speech and data signals is on the electricity wiring inside buildings. In such configurations the internal 240 V mains wiring is used for the transmission of data, with appropriate filtering being provided to add and separate the data signals from the power signals. Additionally a filter, such as the Emlux filter described in European Patent Application 141673, may be provided to prevent data signals leaving the building and entering the power supply network external to the building. The Emlux filter described consists of a tuned ferrite ring which acts effectively as a band stop filter. In order to be effective the band stop filter must be of narrow bandwidth and therefore is not suitable for use with high speed data communications, since a large number of such band stop filters would be required.

As described above, in general there are two basic EDN architectures namely underground (UG) and overhead (OH).

Underground networks are generally composed of a number of different types of "pseudo-coaxial" cables which are screened types of cables providing for propagation of high frequency (HF) communications signals between the inner conductor(s) and outer conductor sheath(s) in an unbalanced mode. Typical values of characteristic impedance for which UG cables may range from 10 to 75 ohms. In particular, transmission of telecommunications signals on such networks is described in the applicant's prior PCT application, published as WO 94/09572, the disclosure of which is incorporated herein by reference. In order to provide maximum power transfer and good impedance matching between the EDN and a HF coaxial termination point, a an unbalanced conditioning unit design is utilised as shown in FIG. 9.

The application of a conditioning device to all the termination points of an underground (UG) EDN will result in the EDN being optimised for the propagation of HF communications signals without any impairment of the EDN's capacity to efficiently deliver electrical energy at ultra low frequencies (ULFs), i.e. 50 to 60 Hz.

As described in WO 94/09572, such an enclosed and conditioned EDN will preferably have HF characteristics, above 1 MHz, which includes:

1. A minimal HF noise floor.
2. Immunity to variable loads at ULFs, i.e. 50 to 60 Hz.
3. A safe point of interconnection for low amplitude HF communication signals.
4. Directional propagation of HF communication signals.
5. Suitable network service termination points for electricity distribution and telecommunications service provision.

Overhead (OH) Networks are generally composed of open wire feeders which are flown on wooden poles or metal towers. The conductors generally run parallel in either horizontal, vertical or triangular configurations and, as such, are. similar to open wire transmission lines which are commonly used for propagating HF communications signals, say between a high power HF broadcast transmitter and a remotely located HF aerial array.

Typical conductor spacing on such OH EDN support structures is approximately 1 meter, with relatively small conductor diameters. As a result the characteristic impedance of such networks is high in relation to similar UG networks. Typical values of characteristic impedance for OH networks extend from 300 to 1000 ohms.

Typical OH EDNs have power factor correction capacitors fitted at regular intervals to compensate for the net effect of inductive power loads at 50/60 Hz. These capacitor banks usually consist of one capacitor per phase conductor connected between the phase conductor and the network neutral and/or earth conductor. The capacitors produce relatively high reactive currents at power frequencies of 50 to 60 Hz which advance the current phasors closer to the voltage phasors thus improving the efficiency of the EDN at power frequencies.

The effect of such capacitors at the traditional mains signalling frequencies of 3 kHz to 148.5 kHz is to severely attenuate the power line carrier signals, often to such a low level as to render the systems inoperative.

It may be thought that this problem would be overcome simply by raising the communications signals above 1 MHz, as the effect of the capacitors becomes insignificant due to the inductive reactance of the interconnecting (jumper) leads and the internal construction of the capacitors. The overall reactance of the capacitors appears inductive at frequencies above 1 MHz and as a result their shunt impedance becomes greater than the characteristic impedance of the OH lines resulting in minimal loading and hence minimal line loss at HF.

However, one resulting problem is that at such frequencies the power transformers appear as a high impedance, inductive, loads above 1MHz and their resultant impedance becomes much greater than the characteristic impedance of the OH lines.

Thus, by utilising frequencies above 1 MHz the power transformer does not significantly reduce the communications signal level or provide HF by-pass between the primary and secondary windings of the power transformer. Power transformers may be considered as low pass filters with cut off frequencies well below 1 MHz.

Another problem with some sections of OH EDNs is that they may have single phase sections fed off the main polyphase network. This may result in an unbalancing of the network creating impedance miss-match and subsequent radiation of the HF signal(s) from the network. This makes the network very lossy and reduces propagation of the telecommunications signals.

A coupling unit ("conditioning unit") is disclosed in WO 94/09572 for coupling high frequency signals to an EDN. However, such a conditioning unit is not particularly well suited to either coupling HF communications signals across power transformers in an OH EDN as described above or to decoupling any single phase sections fed off the main polyphase network.

The present invention aims to provide a method and apparatus for telecommunications transmission on a power network which alleviates some or all of the above problems.

SUMMARY OF THE INVENTION

Accordingly, in a first aspect, the present invention provides a balanced electricity distribution and/or power transmission network, the network including input means for the input onto the network of a telecommunications signal having a carrier frequency greater than approximately 1 MHz from an unbalanced source and output means for removing said telecommunications signal from the network wherein said input means and said output means provide impedance matching between said network and said source.

Thus, propagation of HF communication signals over such networks is optimised, and the input and output means ("conditioning units") provide for interconnection between a source e.g. a relatively low impedance unbalanced HF (possibly coaxial) termination, and a high impedance balanced OH EDN, and provide efficient unbalanced to balanced impedance transformation and termination.

In this way both speech and data signals can be transmitted at carrier frequencies of greater than approximately 1 MHz, allowing for a larger available spectrum and greater transmission capacity. The carrier frequency may in fact be less than 1 MHz ie. 800 KHz or even as low as 600 KHz, but as it is reduced so is the bandwidth.

A plurality of telecommunications signals may be provided, each having different carrier frequencies. The term "carrier frequency" refers to the unmodulated frequency of the carrier signal, and not to the frequency of the telecommunications signal once modulated.

On, for example, a 400 V network the carrier frequency may preferably be between 1–10 MHz, and on, eg., a 11 kV network may be between e.g. 1–20 MHz, or possibly 5–60 MHz. However the frequency may be up to 100's of MHz depending on the network and the application. For example, over short distances (10–20 m) a frequency range of e.g. 1–600 MHz or 1–800 MHz may be used.

The power network may include one or more phases. Preferably the network is a polyphase network including e.g. any one or more of 2, 3, 4, 5, 6, 7 etc phases. Different sections of the network may include different numbers of phases.

The network may typically be a trunk and branch multipoint (or multipoint to point) electricity distribution and/or power transmission network.

Preferably the network is balanced i.e. provides balanced transmission characteristics. The network may be an "overhead" network i.e. the cable(s) of the network may lie above ground e.g. flown or strung between pylons.

Preferably at least part (or all) of the transmission network is external to any building or premises such as an office or house and the signal(s) is/are transmissible along said external part. Inside such buildings, transmission distances are typically short and therefore attenuation losses relatively unimportant.

Preferably the power network is a major (e.g. overground) power network including e.g. any or all of 132 kV, 33 kV, 11 kV, 415 V and 240 V sections. The telecommunications signals may be transmitted over any or all of the sections of the power network by suitable detection, amplification and/ or regeneration and reintroduction as and when necessary.

Preferably the network includes connection means located at at least one, and preferably all, of the interconnection points between the OH EDN and any interconnecting UG EDNs. The connection means provide impedance matched HF connection between the OH and UG EDNs to permit efficient propagation of HF communication signals between the OH and UG network sections. This helps to ensure that the HF communication signal power may be kept to a minimum in order to reduce the level of radiation from any unscreened OH EDN sections.

In order to overcome the problem of coupling HF communications signals across transformers at various voltage levels a HF by-pass unit is preferably provided which can either provide for balanced to balanced or balanced to unbalanced by-pass in either direction, i.e. primary to secondary or secondary to primary sides of the power transformer.

The by-pass unit may utilise any or all of: fuse protection, capacitive coupling, dust iron or ferrite transformer impedance matching and balanced or unbalanced termination capability. The frequency response of the ferrite materials at 50 to 60 Hz is negligible and by suitable centre tapping of the primary and/or secondary windings together with adequate insulation of the core materials good flashover protection may be provided.

It should be noted that by utilising HF communications signals above 1 MHz together with inductor core materials such as dust iron and ferrite, it becomes possible to fabricate both high voltage capacitors and high impedance inductive elements which are sufficiently small in physical size to be retro fitted to existing OH EDN support structures and in many cases may simply replace existing jumper wires.

In a preferred embodiment, full duplex facilities are provided by utilising, for example, frequency (FDD), time (TDD) and/or code division multiplexing and/or multiple access (CDMA) techniques, i.e. signals may be transmitted and/or received in all directions simultaneously.

A network according to the present invention may be used for many speech and/or data transmission purposes, such as remote reading of electricity meters, remote banking and shopping, energy management systems, telephony (voice), switched telephony, security systems and/or interactive data services, multimedia services and television.

A wide range of different transmission techniques are available for use with electricity power line communications, each using various modulation methods including frequency, time and code division multiplexing. It has been determined that the spread spectrum method offers inherent security and good interference rejection characteristics. These properties are achieved using a large bandwidth and hence requires the design of a specific filter.

Modulation methods include amplitude, frequency, phase; single, double and vestigial sideband, pulse position, width and amplitude; frequency shift keying (FSK), Gaussian filtered FSK (GFSK), Gaussian minimum shift keying (GMSK), Quaternary phase shift keying (QPSK), Orthogonal quaternary phase shift keying (OQPSK), Quadrature amplitude modulation (QAM), Pi/4 QPSK etc.

A large number of standard cordless, mobile and cellular radio phone communication techniques may be suitable for effecting signal transmission over a conditioned network.

According to a further aspect, the present invention provides a method of signal transmission including input of a telecommunications signal having a carrier frequency of greater than approximately 1 MHz from an unbalanced source onto a balanced electricity power distribution and/or transmission network and subsequent reception of the signal. Preferably, said signal is transmitted using frequency, time and/or code division multiplexing techniques.

In a further aspect, the present invention provides a communications apparatus (known hereinafter as a "network conditioning unit") for use with a network according to the first aspect of the present invention. The network conditioning unit includes a pair of balanced low pass filter portions for filtering out the low frequency high amplitude mains power signal i.e. separating it from the telecommunications signal(s) and allowing it to pass through the conditioning unit. The unit also includes a pair of balanced high pass coupling elements for input and removal of telecommunications signals from the network and, preferably, a terminating element of similar impedance to the characteristic impedance of the network at that point.

The use of such a unit allows HF signals to be input onto the network and LF marks signals to pass through the unit.

Such a unit may also be used to ensure that the high frequency telecommunications signals may pass around transformers on the EDN and/or may or may not (as appropriate) be coupled to connecting UG EDN's.

Preferably, the variable electrical loading effects (i.e. the load impedances) of all items which are coupled onto the network from time to time and which utilise electrical energy (i.e. the electrical loads) are isolated from the communications signals by the action of low pass filter element(s) of the conditioning unit(s).

Preferably the conditioning unit can be connected to the network in both a balanced and unbalanced configuration.

Preferably the network conditioning unit provides impedance matching between reception/transmission devices and the power network. Additionally the network conditioning unit may carry full load or fault current at power frequencies whilst still carrying the voice and data signals.

In a third aspect, the present invention provides a method of signal transmission using a network as described herein.

Where signals are being transmitted along a polyphase (e.g. three phase) electricity power network, the signal propagation may be between any or all of the phases and ground. In preferred embodiments the signal is injected between any two of the phases, or between one of the phases and a neutral conductor.

Where signals are being transmitted along a single phase electricity distribution service cable a pseudo-coaxial effect may be obtained. Single phase cables may typically be either concentric or split-concentric. In the case of a split-concentric cable, means (such as a capacitive coupling between the parts of the split- concentric sheath) may be provided so that at the desired frequency the cable behaves as a standard concentric cable. Thus a pseudo-coaxial effect is achievable and the cable provides an unbalanced transmission characteristic.

Preferably, any spurious self resonance in the inductive or capacitive elements are avoided. As the lower cut off frequency of the conditioning unit is increased the minimum values of inductance and capacitance may be proportionally reduced.

In a further aspect, the present invention provides an overhead electricity distribution and/or power transmission network having a number of phases, said number being chosen from the list 1,2,3,4,5,6,7,8,9, . . . n (where n is an integer greater than 9), but preferably having 1, 2 or 3 phases, and including input means for the input of a telecommunications signal having a carrier frequency greater than approximately 1 MHz onto at least one of the phase conductors of the network and output means for removing said telecommunications signal from at least one other phase conductor of the network.

In a further aspect, the present invention provides a balanced electricity distribution and/or power transmission network, the network including input means for the input onto the network of a telecommunications signal having a carrier frequency greater than approximately 1 MHz and output means for removing said telecommunications signal from the network.

In a further aspect, the present invention provides a method of signal transmission including input of a telecommunications signal having a carrier frequency of greater than approximately 1 MHz onto at least one phase conductor of an overhead and/or balanced electricity power distribution and/or. transmission network, and subsequent reception of the signal from at least one other phase conductor of the network, said network having a number of phases, said number being chosen from the list 1,2,3,4,5,6,7,8,9, . . . n (where n is an integer greater than 9), but preferably having 1, 2 or 3 phases.

Any or all of the above aspects may include features described elsewhere in this specification.

BRIEF DESCRIPTIONS OF THE DRAWINGS

Embodiments of the present invention will now be described with reference to the accompanying drawings in which.

DETAILED DESCRIPTION OF THE PREFERRED EMBODIMENTS

Figure 1:
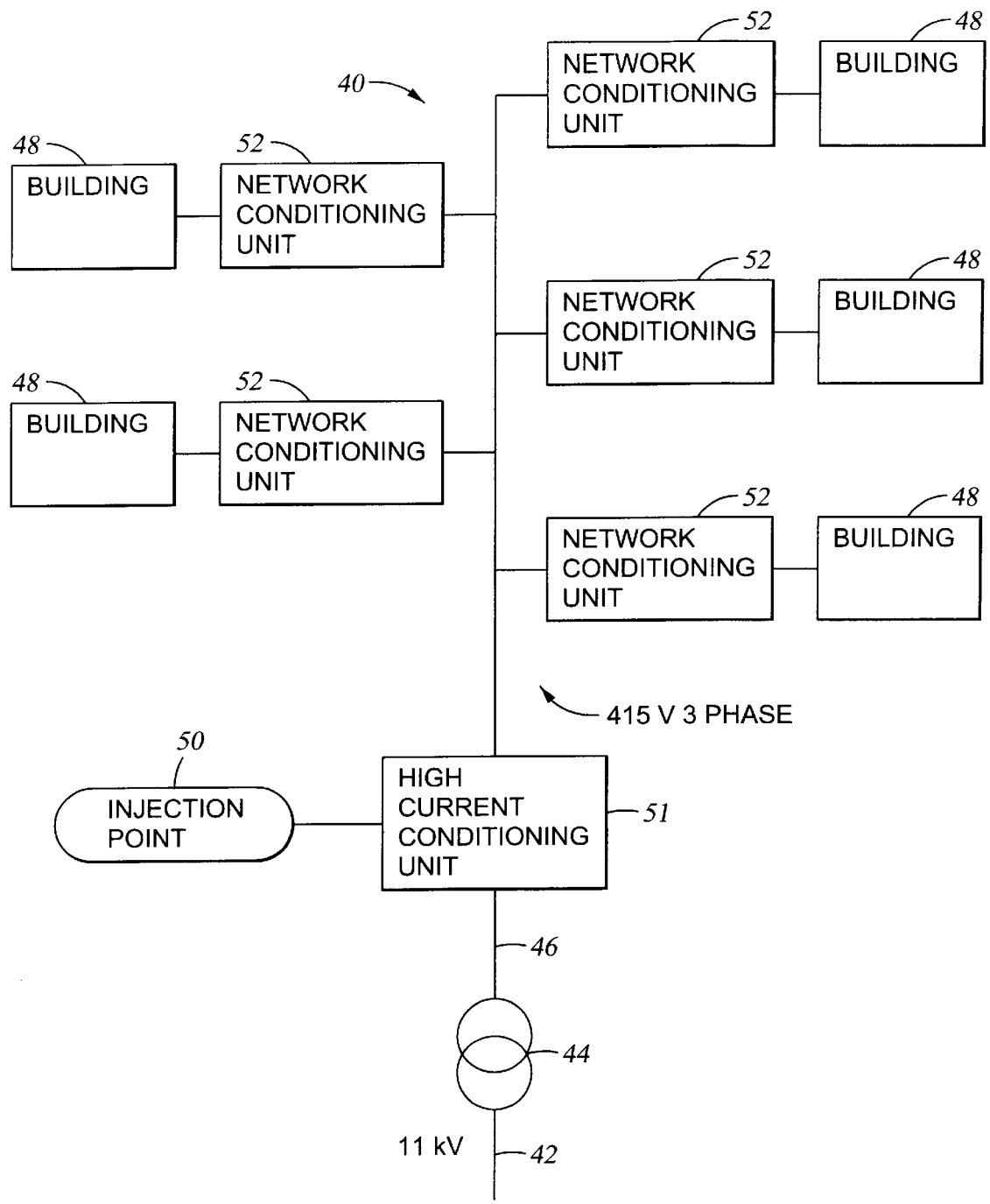
FIG. 1 is a schematic diagram of a part of a network in which aspects of the present invention may be used.

FIG. 1 shows generally a network 40. Mains electricity enters the network from an 11 kV transmission line 42 (e.g. an OH EDN), via a transformer 44 and onto a 400 V three phase network 46. The 400 V three phase network is supplied to a number of locations, such as buildings 48. Each of these buildings may receive only a single phase electricity supply or alternatively may receive a three phase power supply.

Voice and data signals may be injected into the network (or alternatively received from the network) at a point 50, to be transmitted and/or received by users in the premises 48. In order to separate the voice and data communication signals from the low frequency high amplitude power signal each signal source and/or destination is provided with an unbalanced conditioning unit 52—shown in more detail in FIG. 9. This network conditioning unit includes a low pass filter for separating out the two signals.

The present invention is primarily concerned with the propagation of HF signals on the OH EDN 42.

A further (high current) conditioning unit 51 may be fitted between the electricity distribution transformer 44 and the injection point 50 in order to further remove transformer noise from the conditioned network 40. The unit 51 is fitted with a high current inductor.

Figure 2:
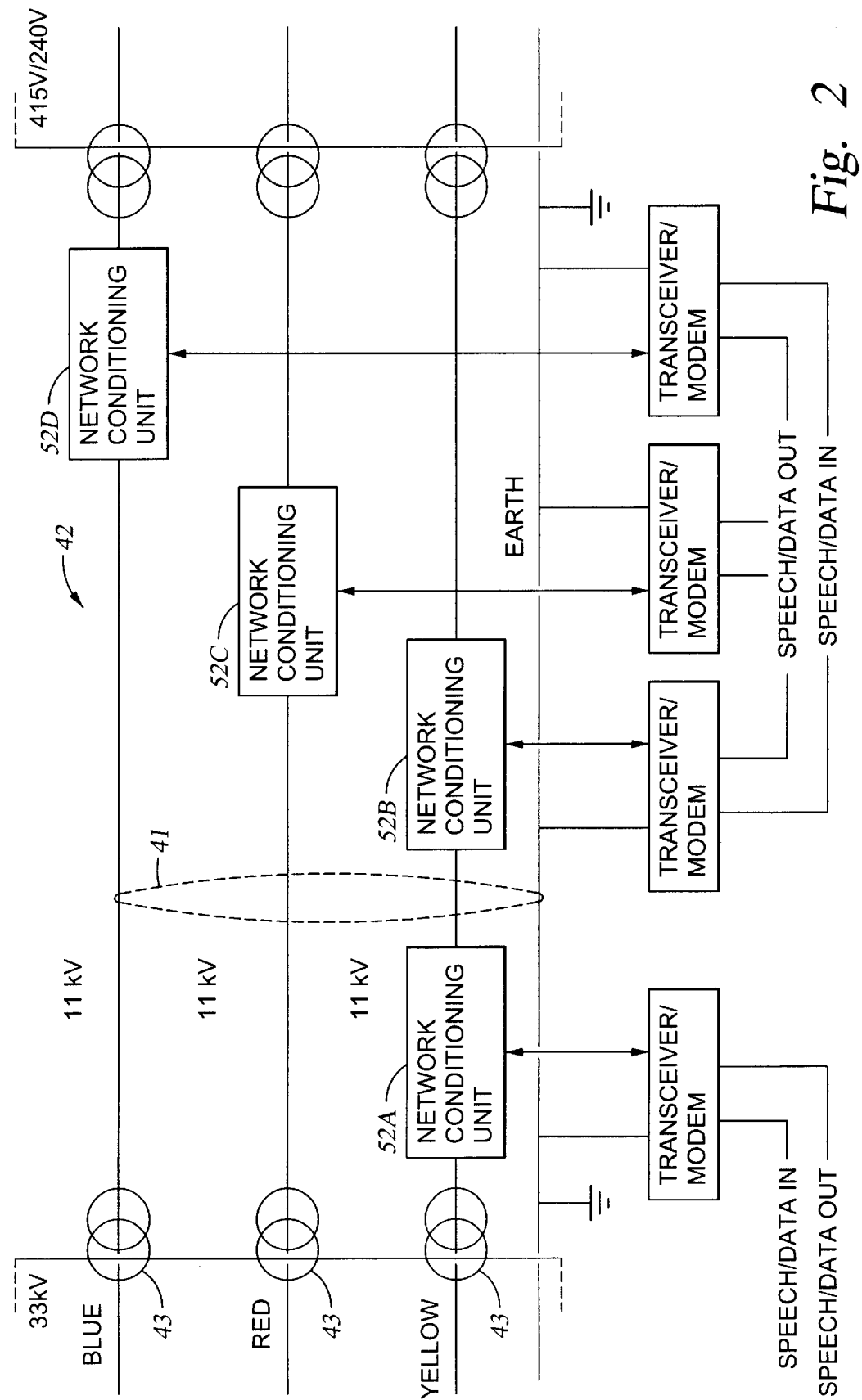
FIG. 2 is a schematic diagram of a first transmission system for a network according to FIG. 1.

FIG. 2 shows a portion of an OH 11 kV three phase network 42 into which and from which data signals may be transmitted and received using the network conditioning units 52A, 52B, 52C, 52D. If the cable of the network 42 is underground, it is clad i.e. is surrounded by a sheath 41 e.g. along all or substantially all of its length. However, if the set of cables are overhead(as is the case with most embodiments of the present invention), such a sheath is omitted.

As an example, data signals could be transmitted onto the yellow phase of the network by network conditioning unit 52A i.e., the signal is applied between the yellow phase and earth/neutral as shown. The transmitted data may then be received by any or all of conditioning units 52B, 52C and 52D which are connected to the yellow, red and blue phases respectively. In other words transmitted data may be picked up on any phase of the cable, including the phases onto which the signals were not injected by the transmitting unit. As can be seen, data can be transmitted and received by each unit.

Each phase of the network 42 is shown to include a transformer 43. Typically this is effected by a single three phase transformer unit for all three phases, and not by three separate single phase transformers—although the latter may be possible.

Figure 3:
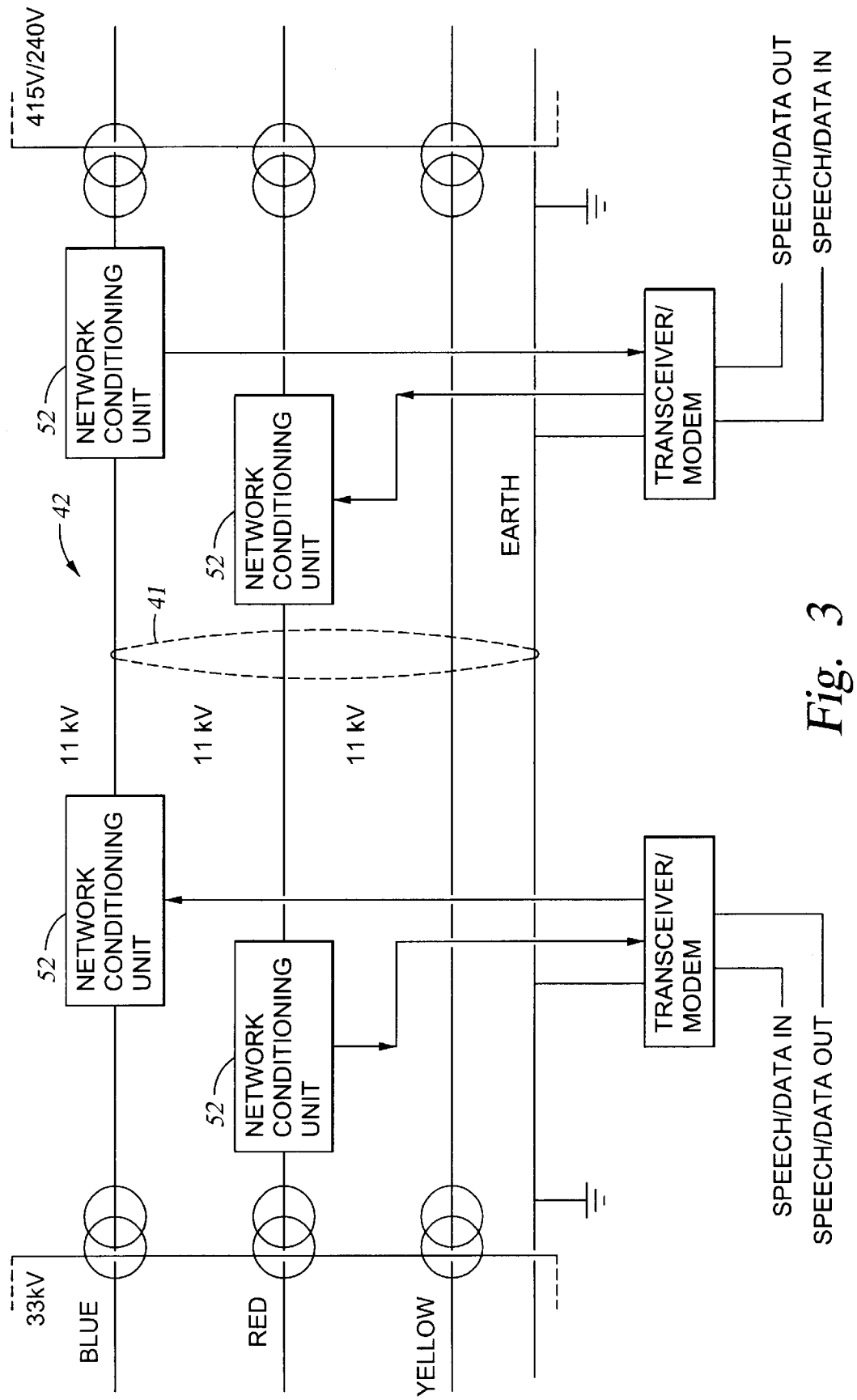
FIG. 3 is a schematic diagram of a second transmission system for a network according to FIG. 1.

FIG. 3 shows a portion of a three phase network 42 into which and from which data signals may be transmitted and received using four network conditioning units 52. As shown, the data signals are transmitted across two phases of the three phase network—in this case the red and blue phases. This example could also apply to a balanced network, using balanced conditioning units 1301.

If one or more phases are not in use (e.g. the yellow phase in FIG. 3), the non-used phases(s) may be terminated to provide an appropriate impedance. This may be done using an "L" circuit i.e. a series inductor with a shunter capacitor on the transformer side. This provides an optimum impedance and ensures that an RF signal which is coupled between e.g. the red and yellow phases, is not shunted down by a low impedance transformer connection. This is particularly useful if there is insufficient inductive reactance at e.g. the yellow phase transformer connection point.

Figure 4:
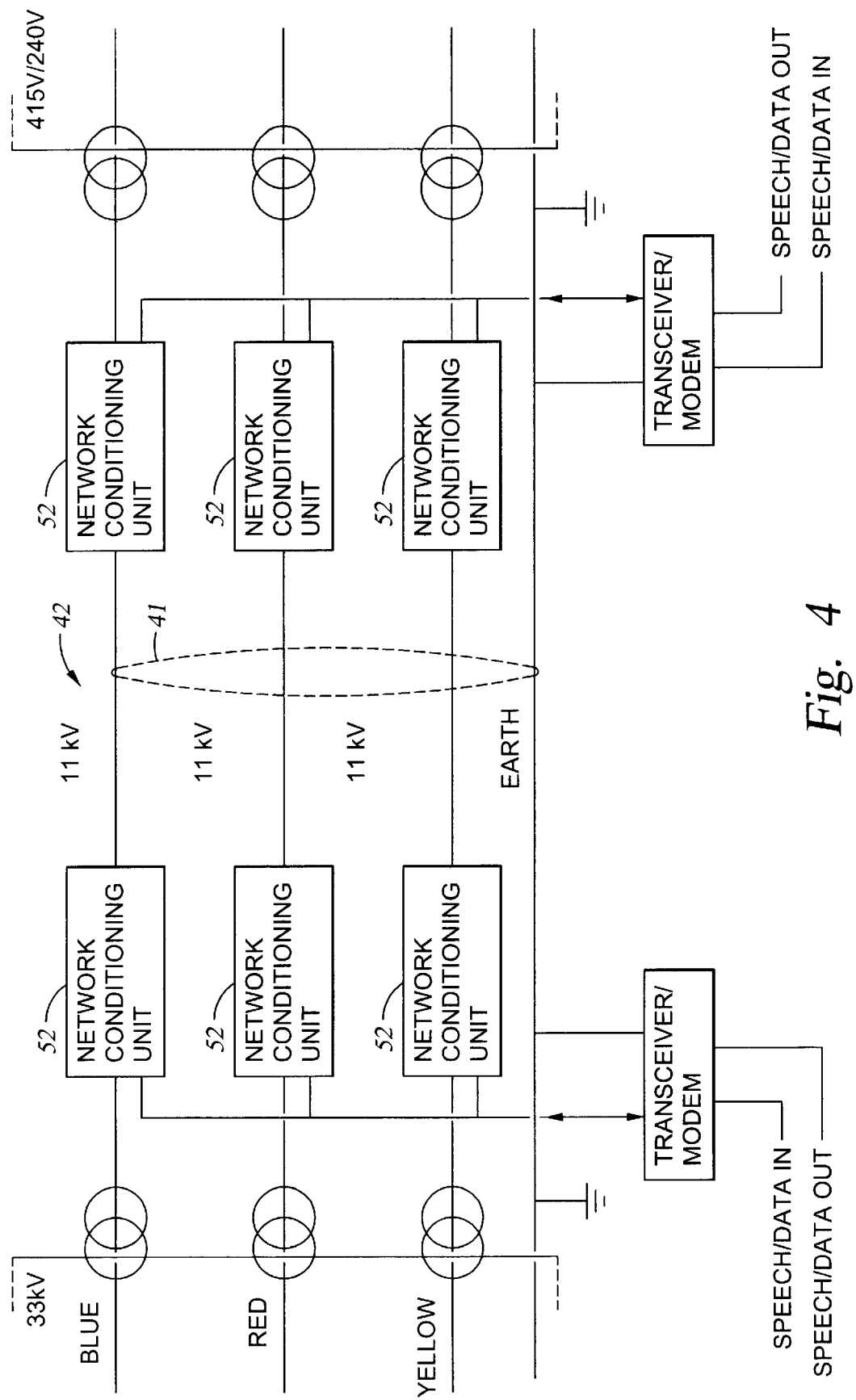
FIG. 4 is a schematic diagram of a third transmission system for a network according to FIG. 1.

In FIG. 4 an alternative transmission system to FIG. 2 is shown, in which the data signals are transmitted across all three phases, i.e. blue, red and yellow, of the three phase network 40.

Figure 5B:
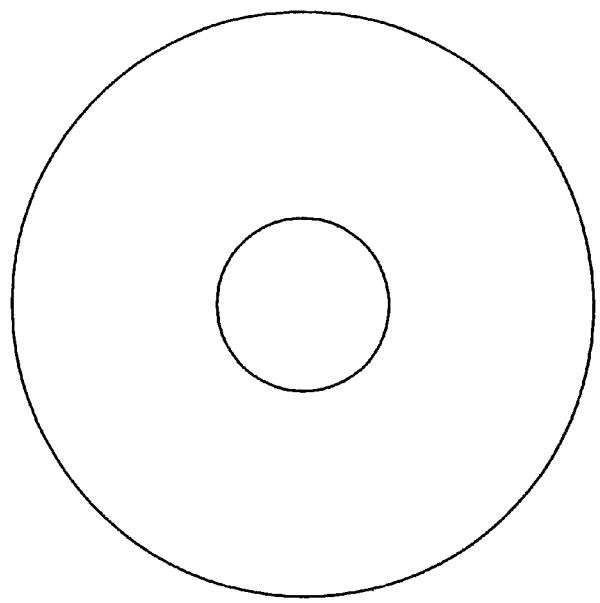
FIG. 5B is a section through a typical coaxial cable.
Figure 5A:
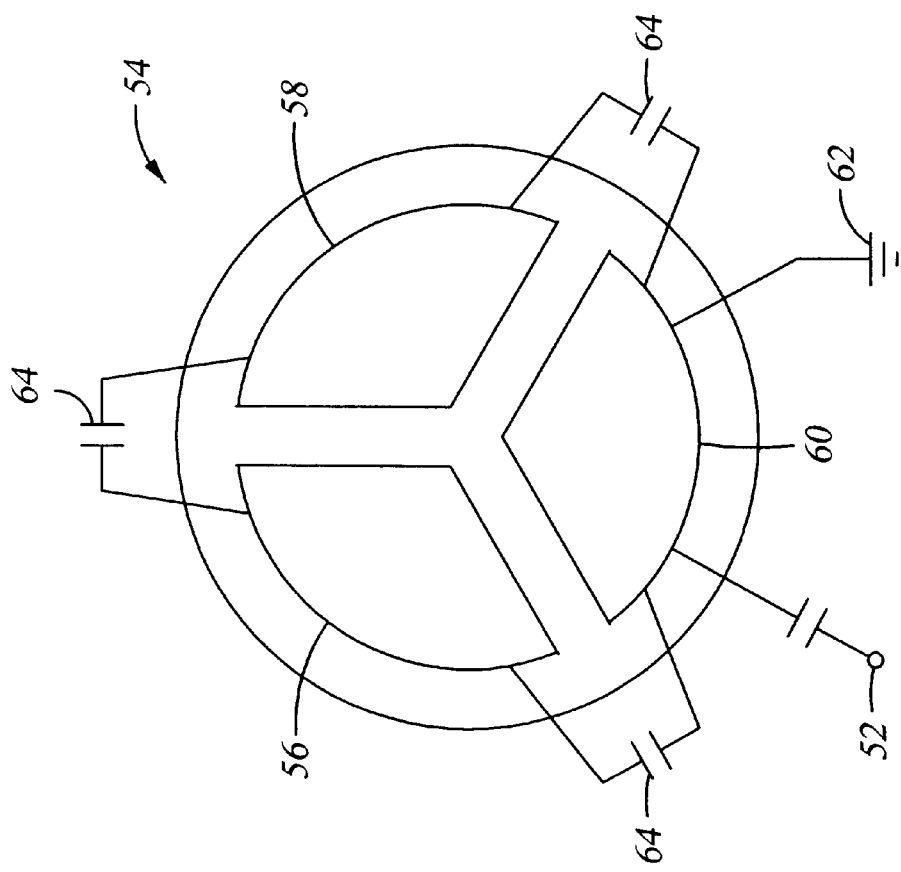
FIG. 5A is a cross section through a typical three phase cable.

FIG. 5A shows a simplified cross section of a typical three phase underground power cable 54, including red phase 56, yellow phase 58, and blue phase 60. Data signals are transmitted between blue phase 60 and earth 62, and are injected into the network via network conditioning unit 52.

At high frequencies, the mutual capacitance between the phases effectively produces a close coupling effect. Therefore, such a transmission system gives a pseudo-coaxial characteristic, roughly equivalent to the coaxial cable shown in FIG. 5B. The mutual capacitance between any two of the phases in the three phase cable is shown schematically as 64 in FIG. 5A—similar mutual capacitance exists between other parallel conductors within single construction multi-conductor cables. This is how the HF signals are propagated on UG EDN's connected to an OH EDN.

Figure 6:
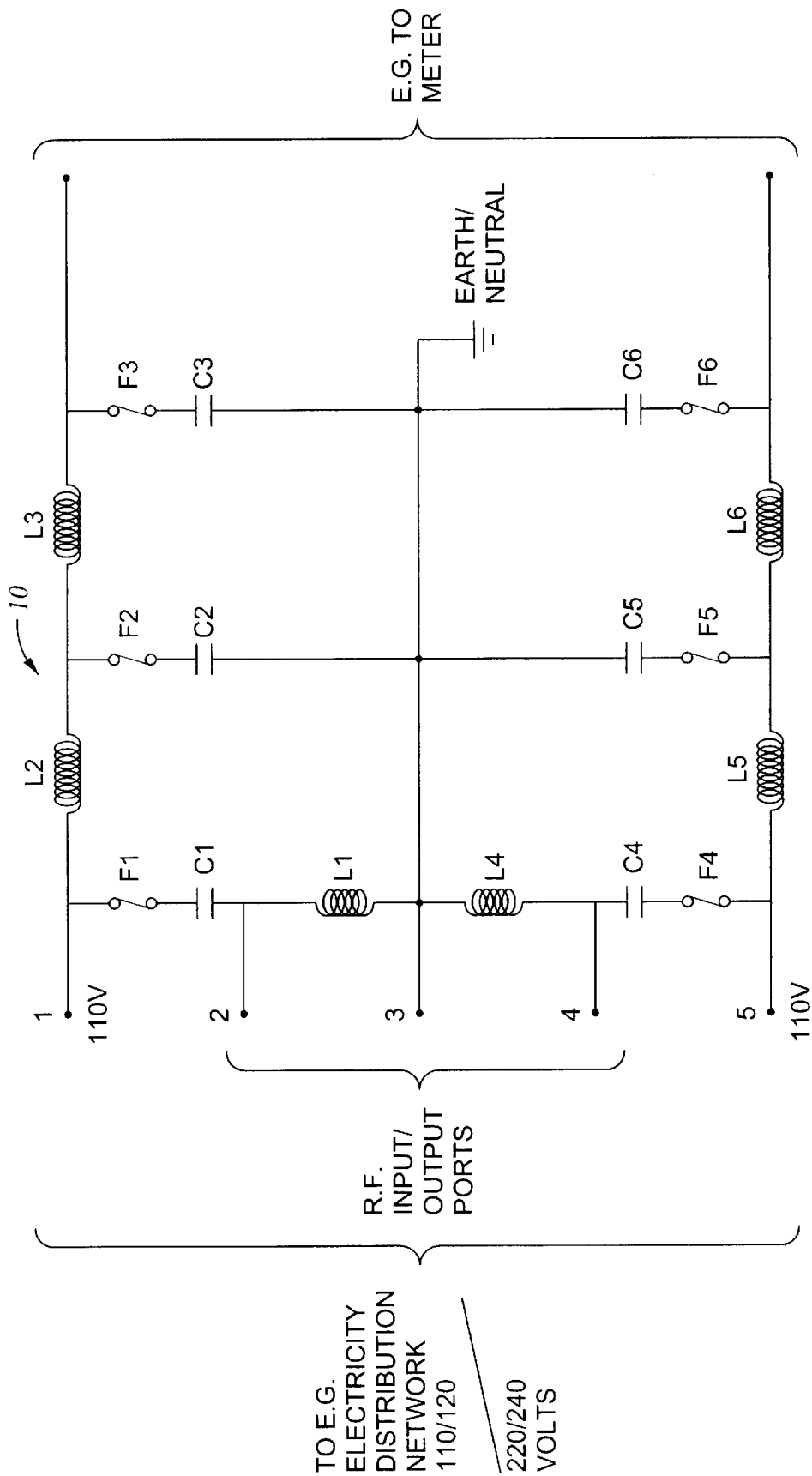
FIG. 6 is a first embodiment of a network conditioning unit according to the present invention.

Referring to FIG. 6, an embodiment of a balanced conditioning unit according to an aspect of the invention is indicated generally by the reference numeral 10. The conditioning unit 10 has dual high frequency signal connections balanced about 0 V and/or earth.

The EDN connections are made via terminals 1 and 5 and may be for example 110 V term 1, 0 V term 3 and 110 V term 5, or 230 V term 1, 0 V term 3 and neutral term 5. Fuses F1 and F4 protect capacitors C1 and C4 respectively in case of failure, having low frequency paths to 0 V and/or earth via L1 and L4 respectively.

C1 together with L1, and C4 together with L4, form high pass filter elements permitting high frequency signals above 1 MHz to be applied at terminals 2 and/or 4, to couple via C1, F1 and C4, F4 to the EDN terminals at 1 and 5 respectively. Inductors L2 and L5, together with capacitors C2 and CS, provide low pass filter sections each having capacitor protection via fuses F2 and F5 respectively. Two similar filter units are cascaded and are formed similarly with L3 and L6 together with capacitors C3 and C6 with similar capacitor protection via fuses F3 and F6 respectively. These low pass filter units allow the ultra low frequency 50 to 60 Hz power components to pass without distortion and to be connected to the customer wiring via pins 6 and 7.

The communications signals may be interconnected in a balanced mode via terminals 2 and 4 or split unbalanced modes between terminals 2 and 3 or 4 and 3 respectively.

The absolute values of the capacitive and inductive components will depend upon the characteristic impedance of the EDN but typical values for a 50 ohm impedance EDN are L2=L3=L5=L6=16 $\mu$H; C2=C3=C4=CS=C6=0.01 $\mu$Fd. F1=F2=F3=F4=F5=F6=500 mA; L1=L4=150 $\mu$H; C1=C4= 0.01 $\mu$Fd.

In order to efficiently couple telecommunications transmissions lines (TTL) it is important to ensure:

1. Correct impedance at the point of interface.
2. That the network propagation characteristics remain constant.

When utilising an EDN to carry high frequency communications signals efficiently interact between the TTL and the EDN is made via a conditioning unit. Provided that the TTL us unbalanced, i.e. coaxial or pseudo coaxial and the EDN is similarly coaxial or pseudo coaxial (e.g. a UG EDN), then efficient interface and communications signal cross propagation will result.

However, if it is required to interface between say an unbalanced coaxial or pseudo coaxial TTL, and say an open wire balanced overhead EDN or a floating neutral type EDN either overhead or underground (as is the case with the present invention), then a conditioning unit such as shown in FIG. 6 is required to efficiently transform between the unbalanced and balanced network sections.

Figure 7:
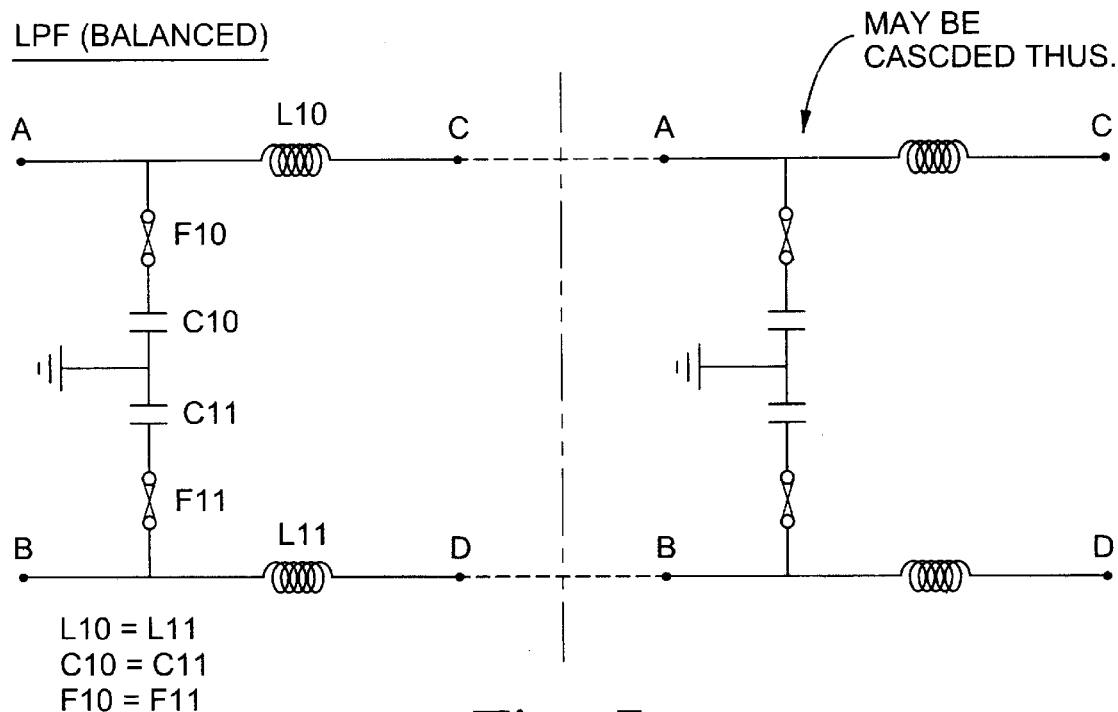
FIG. 7 is a second embodiment of part of a network conditioning unit according to the present invention.
Figure 8:
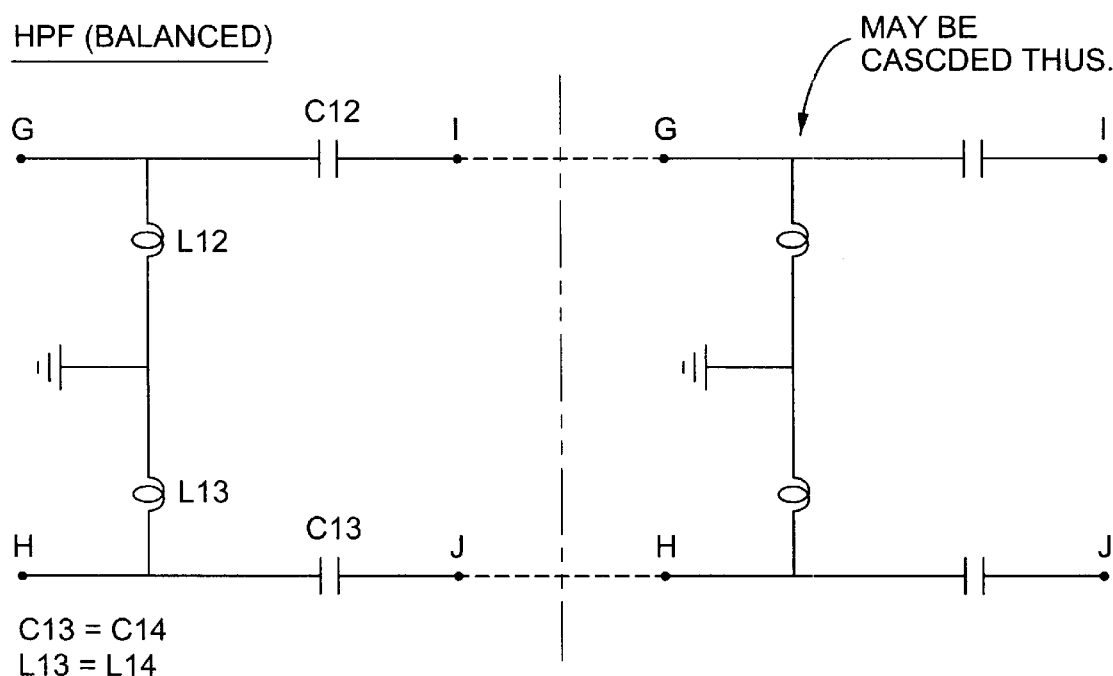
FIG. 8 is a third embodiment of part of a network conditioning unit according to the present invention.

FIGS. 7 and 8 show embodiments of, respectively, low pass and high pass filter elements which could make up a conditioning unit according to the present invention.

FIG. 7 shows how inductors and capacitors may be combined to form low pass balanced filter elements and how they may be cascaded to improve performance. For frequencies above 1 MHz the inductors and capacitors may be manufactured with sufficiently small physical dimensions so as to be included in overhead EDNs without the need for major restructuring of the existing pole or tower mounted components.

A typical value for a LPF inductor element, say L10 or L11, for an overhead EDN with a phase to phase line d impedance of say 600 ohms, is on the order of 50 $\mu$H. Such an inductor may be formed over a ferrite core to further reduce its physical size and provide for a LPF cut off frequency below 1 MHz. The inductive element is also designed to carry full EDN load and fault currents.

If the low cut off frequency of the filter is raised to say 5 MHz then the value of the inductor may be reduced proportionally to 10 $\mu$H with further reduction in the physical size of the element. Two inductors of similar value should be utilised, shown in FIG. 7 as L10 and L11, in order to maintain a balance of the lumped transmission line parameters.

Similarly, the LPF decoupling capacitors C10 and C11 have typical values between 0.01 and 0.001 $\mu$Fds. Capacitors of these values may be of relatively small physical size for working voltages up to 33 kV and are easily mounted at the appropriate points on overhead EDN poles or towers without restructuring of the existing components.

Such LPF elements may form part of a balanced EDN conditioning unit design, as shown in FIG. 6.

FIG. 8 shows how inductors and capacitors may be combined to form balanced, high pass filter (HPF) elements and how they may be cascaded to improve performance. For frequencies above 1 MHz the inductors and capacitors may be manufactured with sufficiently small physical dimensions so as to be included in overhead EDNs without the need for major restructuring of the existing pole or tower mounted components.

A typical value for a HPF inductor element, say L13 or L14, for an overhead EDN with phase to phase line impedance of say 600 ohms is in the order of 250 $\mu$H. Such an inductor may be formed over a ferrite core to further reduce its physical size and provide for a flat HF amplitude response above 1 MHz, with minimal attenuation, when combined with C13 and C14.

The prime objective of these shunt inductive elements is to provide low impedance paths to the earth and/or neutral of the EDN should a capacitive element fail. The resulting high current at 50/60 Hz will then cause protective devices such as series line fuse links to blow and protect the EDN accordingly. The inductors also sharpen the frequency response of the HPF units.

A typical value for the HPF coupling capacitors C13 and C14 lies between 0.01 and 0.001 $\mu$Fds. Capacitors of these values may be relatively small in physical size for working voltages up to 33 kV and are easily mounted at the appropriate points on overhead EDN poles or towers without restructuring of the existing components.

The values given for these components are exemplary only, and different preferred values will be appropriate for other design frequencies.

Figure 10:
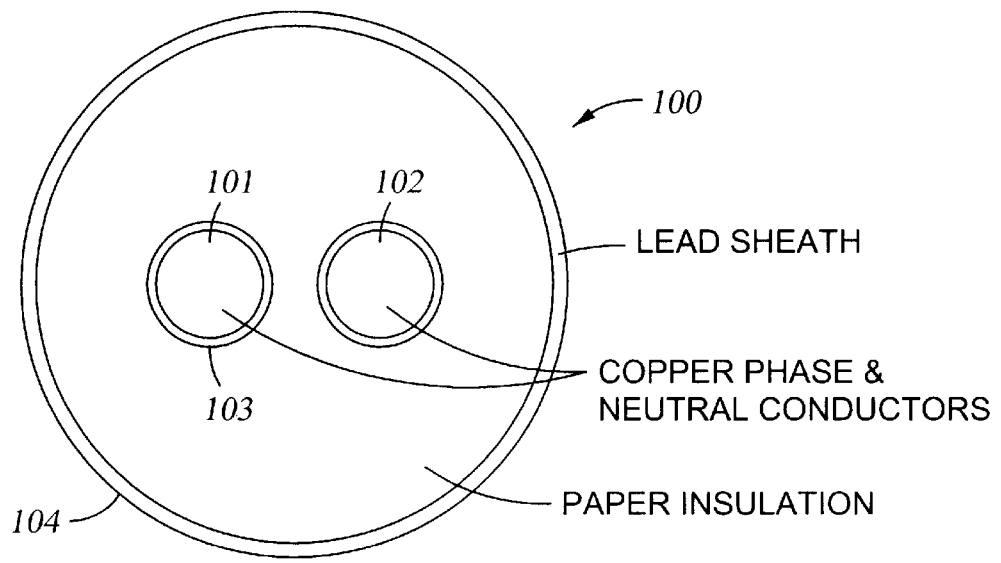
FIG. 10 is a cross-sectional diagram of a floating neutral-type EDN cable.

FIG. 10 shows a cross section through an EDN cable 100 which is designed to provide a floating neutral. One of the conductors (101,102) carries the 50/60 Hz phase voltage, the other carries the neutral or star/wye point potential. Each conductor is insulated by e.g. impregnated paper or a polymer type medium 103 and the cable is covered in e.g. a lead, copper or aluminium sheath 104 which may be further protected by steel wire armour.

The lead sheath is normally at earth potential and in the UK is bonded to earth at the distribution transformer point. The conductors may be of copper or aluminium construction and under normal conditions the 50/60 Hz phase and neutral currents should be equal in magnitude and opposite in phase, i.e. balanced.

At high frequencies above 1 MHz the cable may be treated as a pseudo-screened cable with signal propagation between the earth sheath and phase conductor, the earth sheath and neutral conductor or between the phase and neutral conductors.

In the UK, UG EDNs usually have the neutral bonded to earth at the transformer point, therefore the HF signals would normally be propagated between the phase conductor and the earthed cable sheath. Then, when connecting to a conditioning unit as shown in FIG. 6, the earth cable sheath is attached to the conditioning unit at point 3, the phase conductor at, say, point 1 and the neutral conductor at point 5; the HF communication signals being applied via point 2 and point 3 (earth).

All HF signal components on both the phase conductor and those capacitively induced onto the neutral conductor will be attenuated by the low pass filter sections created by L2 C2, L3 C3, L5+C5 and L6+C6 respectively. Therefore, at point 6 only the required 50/60 Hz phase voltage, with respect to neutral at point 7, is presented at the customer's electricity meter point.

Figure 9:
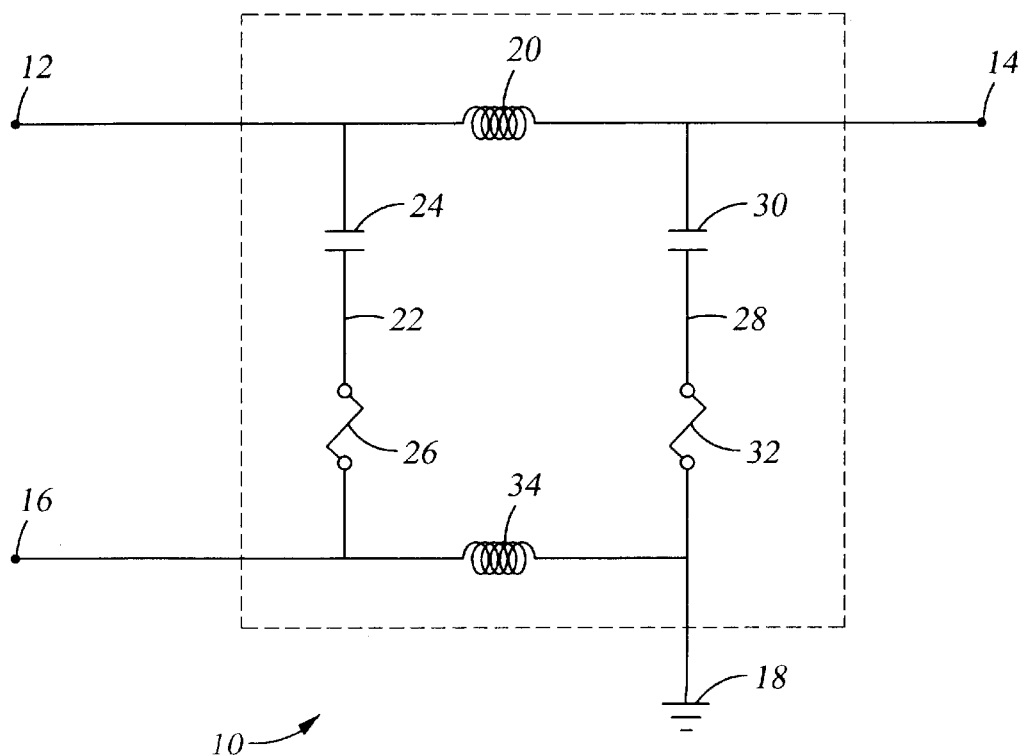
FIG. 9 is a schematic diagram of an unbalanced conditioning unit.

Referring to FIG. 9, an unbalanced conditioning unit—as shown in WO 94/09572—is indicated generally by the reference numeral 10 and is connected between a mains electricity input 12 and a mains electricity output 14. A signal input/output line 16 is also connected into the filter. The mains power line is a standard 50 Hz mains electricity power supply providing a domestic electricity power source of 240 v at a maximum current of 100 amps for normal usage.

The filter 10 is assembled into a metal box which prevents radiation of the communication signals to externally located appliances and which provides a connection 18 to earth for the signal input/output line 16. The filter 10 includes a first or main inductor 20 formed e.g. of 16 mm$^2$ wire wound on a 10 mm diameter, 200 mm long ferrite rod with 30 turns of wire therearound. This provides an inductance of approximately 50 $\mu$H. This may be a minimum for the signal characteristics utilised. The use of better materials or a plurality of series inductors would increase the inductance of the inductor up to, for example, approximately 200 $\mu$H.

Each end of the main inductor 20 is provided with a 30 connection to the signal input/output line 16. A first connection 22 between the mains electricity input 12 and signal input/output line 16 comprises a first or coupling capacitor 24 having a capacitance of between 0.01 and 0.50 $\mu$F, and preferably around 0.1 $\mu$F. This coupling capacitor 24 is connected to a first fuse 26 which is arranged to blow in the event of failure or a fault developing in capacitor 24.

A second connection 28 includes a second capacitor 30 having a capacitance of between 0.001 and 0.50 $\mu$F, preferably around 0.1 F. This capacitor provides further attenuation of the communication signals by shorting to the earth or ground 18. A second fuse 32 is provided to blow if a fault develops in the second capacitor 30, thereby preventing further unit damage.

The signal input/output line 16 is connected to a second inductor 34 having an inductance of approximately 250 $\mu$H minimum. This inductor is provided as a damage limiter in the event of failure of the coupling capacitor 24. In the event of such a failure this inductor provides a path to the ground 18 for the 50 Hz mains electricity power frequency, thereby blowing fuse 26. The inductor has no effect on the communication frequency signals present on the signal input/output line 16.

It is to be noted that the neutral conductor is not filtered, and therefore if this unit was to be used with a phase/neutral system, then unwanted signals could still pass through.

Figure 11A:
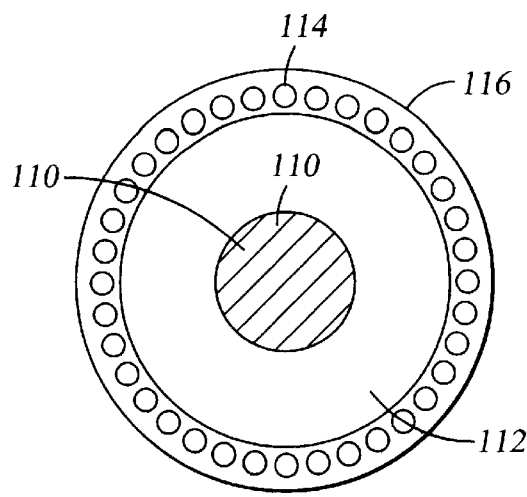
FIGS. 11A, 11B and 11C show sectional views through a concentric, split-concentric and pseudo-concentric cable respectively.
Figure 11B:
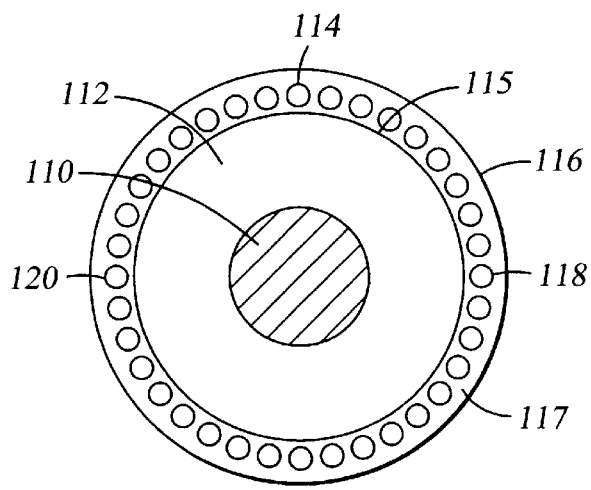
Figure 11C:
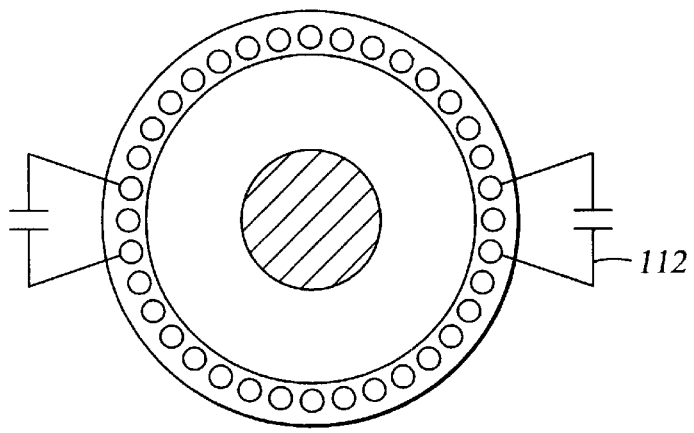

FIGS. 11A, 11B and 11C show sectional views through a single phase concentric, split-concentric and "pseudo"-concentric cables respectively. A typical concentric single phase cable (as illustrated in FIG. 11A) consists of a central metallic conductor core (typically aluminium) 110 surrounded by an insulating layer 112 (typically PVC). Around the insulating layer 112 are laid a plurality of metallic conductors 114 (typically copper) over which lies an insulating and protective sheath 116 (typically PVC).

In use the neutral and earth are combined in the outer sheath of metallic conductors 114.

A split-concentric cable (as illustrated in FIG. 11B) is similar to the concentric cable except that the outer layer of metallic conductors 114 is split into two portions—e.g. an upper portion 115 and a lower portion 117. These portions are divided by insulators 118, 120 and in use the neutral and earth are split so that one portion of the outer metallic sheath carries only one of them.

In order to maintain a psetido-coaxial effect in the split-concentric service cables at the desired transmission frequencies (e.g. above 1 MHz) one or more capacitors 122 may be connected between the upper and lower portions 115, 117 of the outer metallic sheath 114. These capacitor(s) may be fitted e.g. at the termination and/or conditioning points of the cable.

Figure 12:
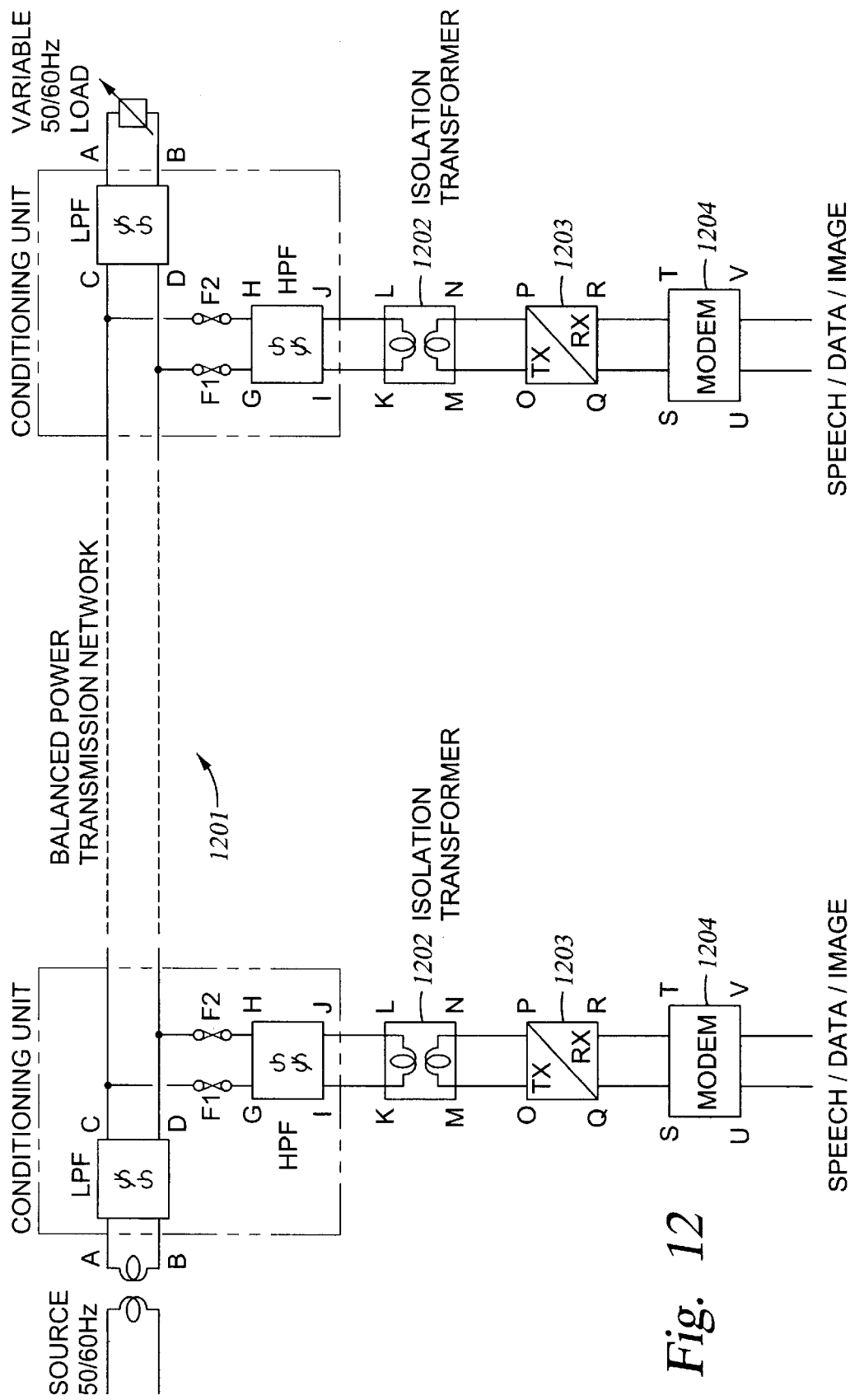
FIG. 12 is a schematic diagram of a two-wire, balanced, power distribution and/or transmission network according to an aspect of the present invention.

FIG. 12 shows the HF conditioning concept according to the present invention applied to a section of, say, OH balanced EDN.

The conditioning unit shown comprises of a LP and a HP filter section (LPF and HPF respectively) connected so as to permit directional coupling of the HF communications signals to the conditioned network section 1201, i.e. the section of EDN between the two conditioning units.

$F_1$ and $F_2$ are typically protective line fuses providing interconnection to the HP filter unit which is in turn coupled to an isolation transformer 1202 consisting of, say, a ferrite core material so as to give good high frequency coupling, primary to secondary windings, between say 1 and 30 MHz.

The transformer is in turn connected to a radio transmitter/receiver unit 1203 which transmits and receives signals at HF by modulating and demodulating the HF carrier signals as appropriate via a modem unit 1204 which inputs and outputs speech/data and/or image signals as appropriate. The speech signals may by-pass the modem and be interconnected directly to the TX/RX unit in an analogue form if required. If the signals input to the modem are presented in a common digital format then they may be easily multiplexed or combined for transmission over the network. The transceivers may operate in simplex, duplex or half duplex as required.

With a conditioned section of balanced EDN as shown, the HF communications highway thus formed is immune to the effects of variable 50/60 Hz loading i.e. HF noise components generated by certain types of 50/60 Hz electrical loads. Directional coupling of HF communications signals above 1 MHz onto any section of balanced OH or UG EDN is thereby permitted.

It should be noted that by utilising high frequencies above 1 MHz the HP and LP filter section components, which form the conditioning units, become sufficiently small, in physical size, to be mounted on e.g. the EDN OH wooden poles or steel pylons without major modification to existing EDN hardware. Similarly on UG EDNs the conditioning unit components may be incorporated in cable joint housings, roadside pillars, street lighting columns and the like.

Figure 13:
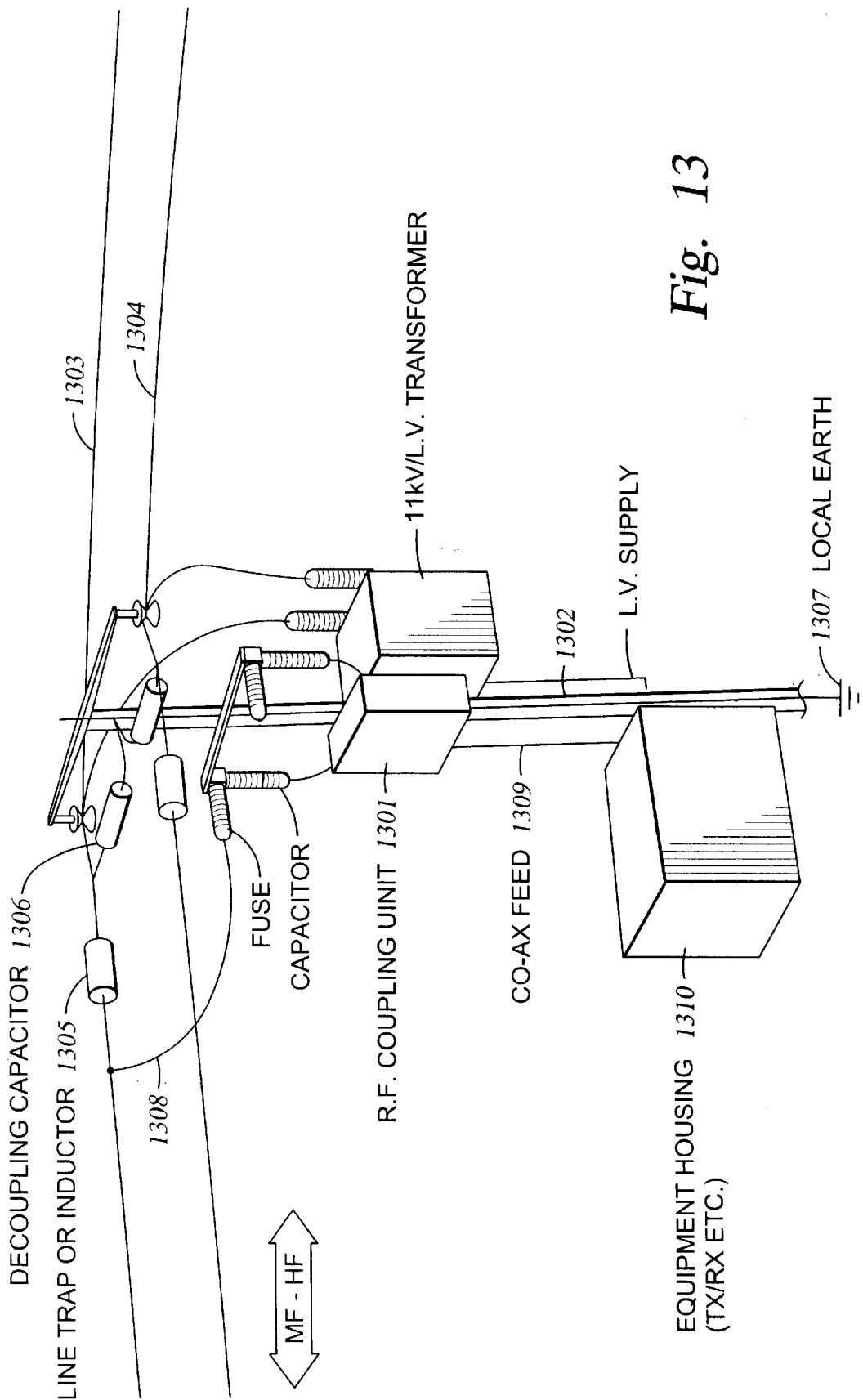
FIG. 13 is a schematic diagram showing a typical layout of signal transmission/reception components at a terminal pole of a power distribution and/or transmission network.

FIG. 13 illustrates the potential location points for the various OH EDN HF conditioning components 1301 as applied to a wooden support pole 1302.

The overhead conductors 1303, 1304 are connected to the head of the wooden pole 1302. A line trap or inductor 1305 may be included in the line of each of the conductors 1303, 1304, and a decoupling capacitor 1306 may connect each conductor to local earth 1307. A tap wire 1308 is taken from one or both of the conductors 1303, 1304 to the RF coupling unit 1301 which is mounted on the pole 1302. A coax feed 1309 then connects the RF coupling unit 1301 to TX/RX equipment 1310.

Figure 14:
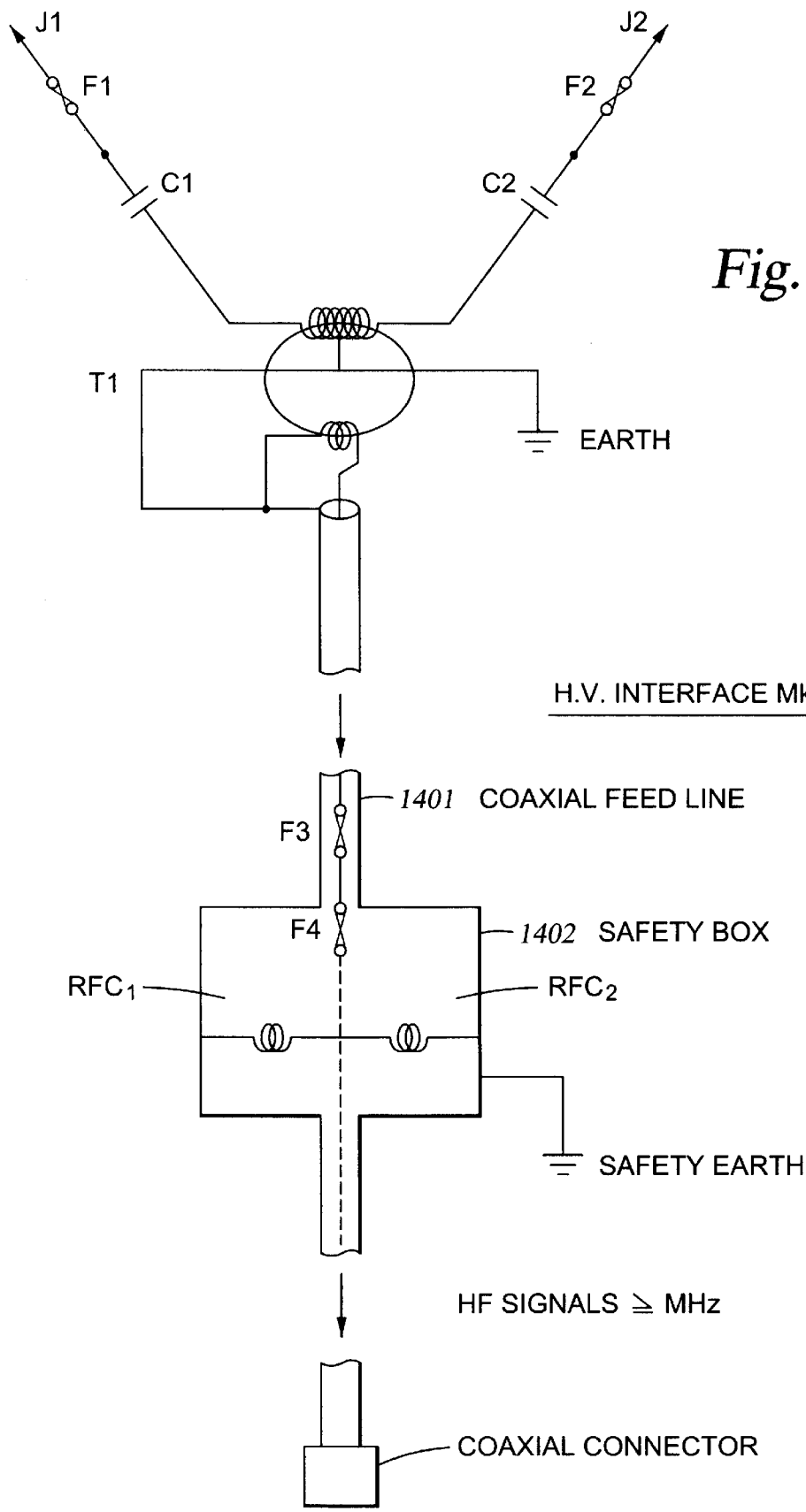
FIG. 14 is a schematic diagram of an embodiment of an interface for connecting telecoms apparatus to a high voltage network.

FIG. 14 illustrates a bi-directional, balanced, OH, EDN conditioning unit such as may be pole mounted as in FIG. 13. $J_1$ and $J_2$ connect onto two phase conductors of a polyphase OH EDN. Protection is afforded by fuse links $F_1$ and $F_2$ and HF coupling is provided by capacitors $C_1$ and $C_2$.

HF electromagnetic coupling is then provided by $T_1$ which has typically a dust iron or ferrite core. The core has the appropriate turns ratio, primary to secondary, to provide the required impedance match between the EDN OH balanced phase conductors and the unbalanced coaxial cable 1401 which will interconnect via the safety box 1402 to the HG transmitter receiver unit(s).

The windings of $T_1$ may be bifilar or trifilar in order to provide the balanced to unbalanced termination requirements. The primary and secondary windings are bonded to earth to provide protection paths for $F_1$ and $F_2$. Optional fuse links $F_3$ and $F_4$ may be included in the safety box.

Typical component values for a 25 kV OH EDN bi-directional conditioning unit might be:

$J_1=J_2=$link wire $F_1=F_2=$GEC HRC fuse links type VTF 15/3

$C_1=C_2=$HVC type TLC150AC–102, 0.001/$\mu$F±20%, 15 kV RMS

@ 50/60 Hz, 50 kVdc between terminals.

$T_1=17$ turns, with centre tap, primary: 5 turns secondary, core type Hawnt Electronics 3C11.

RFC1=RFC2=50 $\mu$H wound on ferrite core to sink potential 50/60 Hz fault current and rupture HRC fuse link(s) F3 and/or F4.

Figure 15:
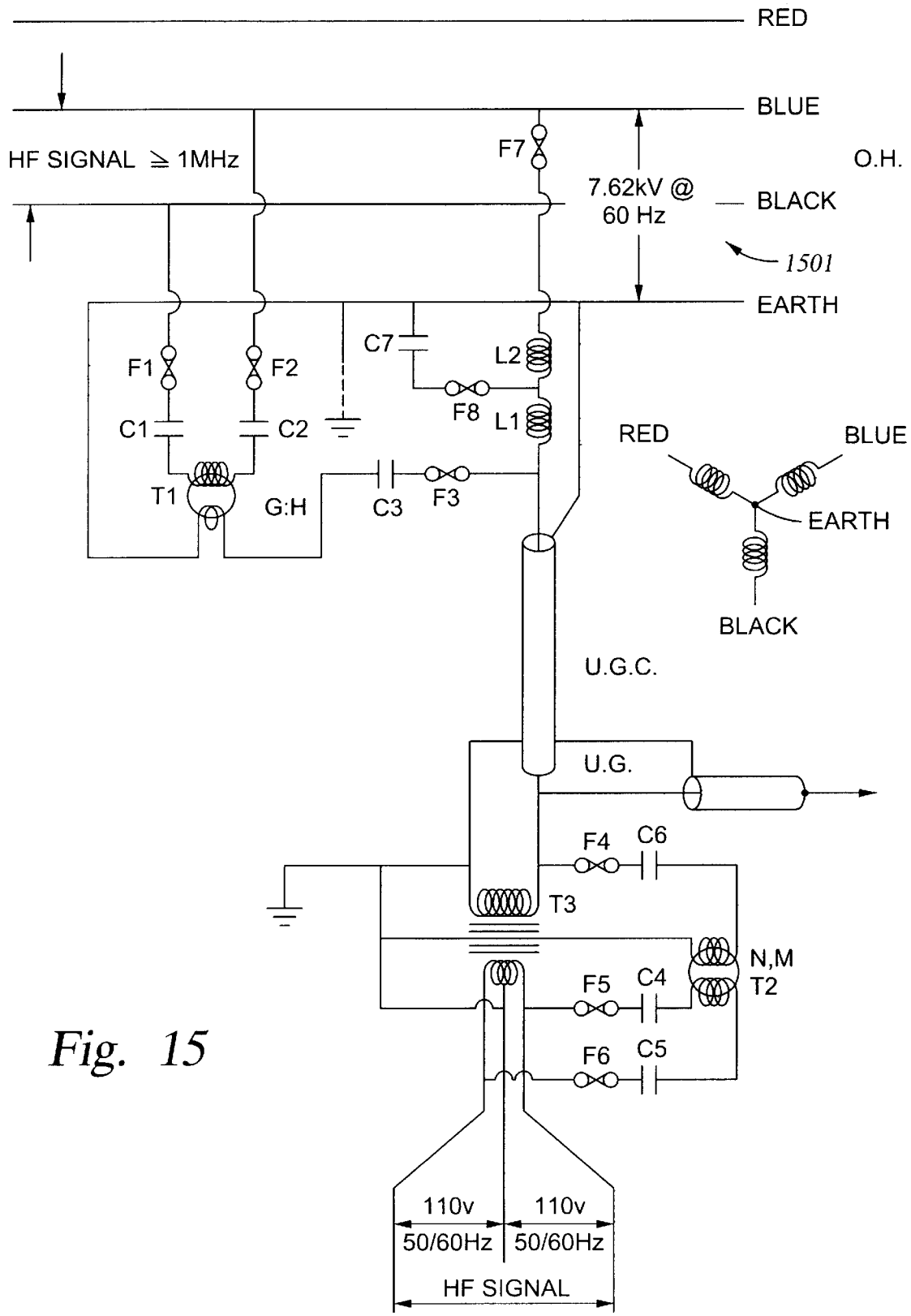
FIG. 15 is a schematic diagram of a circuit for providing an interface between overhead and underground power cables.

FIG. 15 shows a section of-overhead (OH) polyphase (3 phase and earth) electricity distribution network (EDN) 1501. By suitable interfacing, a high frequency communications signal above 1 MHz may be impressed on the network e.g. between black and blue phase conductors.

In order to propagate HF signals efficiently between such a section of OH EDN and a phase to neutral section of UG network, a suitable HF coupling arrangement becomes necessary to overcome the problems of impedance matching and balanced to unbalanced network termination.

In order to provide HF coupling to the OH network, interconnection via a high frequency ferrite transformer element T1 is made via protective fuses F1, F2 and HF coupling capacitors C1 and C2. HF transformer T1 is typically designed to match from a 600 ohm impedance balanced line to a 50 ohm impedance unbalanced UG cable with coupling via HF coupling capacitor C3 and protective fuse F3.

In order to prevent the unbalanced underground pseudo coaxial conductor (UGC) from loading the balanced OH network, a T filter comprising of $L_1$, $L_2$ and $C_7$ is utilised where $L_1$ is typically 16.5 $\mu$H, $C_7$ is typically 0.01 $\mu$Fd and $L_2$ is typically 50 $\mu$H. These modifications provide HF conditioning of the EDN and permit the network to efficiently and safely distribute both electrical energy at ultra low frequency, i.e. 50 to 60 Hz, and communications signals above 1 MHz.

Note that transformer $T_1$ has a centre tapped primary which provides a ULF path for fuses $F_1$ and/or $F_2$ should capacitor $C_1$ and/or capacitor $C_2$ become short circuit.

The UG cable feeds a number of single phase ground mounted transformers each of which has an HF by-pass conditioning unit fitted. The HF signals impressed on $T_3$ primary are coupled via safety fuse $F_4$ and capacitor $C_6$ onto the primary winding of HF transformer $T_2$ which has a ferrite core and is connected in series with earth (0 V).

Thus the unbalanced HF signal present on the UG feeder and across $T_3$ primary is also impressed on $T_2$ primary. It should be noted that the primary impedance of power transformer $T_3$ is relatively high at HF. The turns ratio and windings of T2 are such that the secondary winding presents a balanced impedance transformer HF coupling via $C_4$, $C_5$ and safety fuses $F_5$ and $F_6$ to the balanced centre tapped secondary of $T_3$ and onto the secondary mains cables off $T_3$ secondary to the customer premises together with the ULF high amplitude power components. It should be noted that the secondary windings of $T_3$ represent a relatively low impedance at power frequencies, i.e. 50 to 60 Hz.

The invention is not confined to the foregoing details and variations may be made thereto within the scope of the invention.

I claim:

1. A balanced electricity distribution and/or power transmission network, the network including input means for the input onto the network of a telecommunications signal having a carrier frequency greater than 1 MHz from an unbalanced source and output means for removing said telecommunications signal from the network, wherein said input means and said output means each include an impedance matching transformer to provide impedance matching between said network and said source, and wherein each transformer includes a primary and a secondary winding and the turns ratio between the primary and secondary winding being such as to provide an impedance match between the network and the source, with one of the primary and the secondary windings being operatively connected to the source and the other of the primary and secondary windings being operatively connected to two phase conductors of the network or one phase conductor and earth or neutral.

2. A network according to claim 1 wherein said input means includes means for connecting to a source which is a relatively low impedance unbalanced HF coaxial source.

3. A network according to claim 1 wherein said network is an overhead network.

4. A network according to claim 1 wherein at least part of the network is external to any building and the signal is transmissible along said external part.

5. A network according to claim 1 wherein the network includes connection means located at an interconnection point between the network and an interconnecting unbalanced network, said connection means providing an impedance matched HF connection between the two networks to permit efficient propagation of HF communication signals therebetween.

6. A network according to claim 5 wherein said interconnecting unbalanced network is an underground power network.

7. A network according to claim 1 including two sections of network separated by a power transformer, further including HF by-pass means for transmitting said signal from one of said network sections to the other, by-passing said transformer.

8. A network according to claim 1 wherein the carrier frequency is between 1–60 MHz.

9. A method of signal transmission including input of a telecommunications signal having a carrier frequency of greater than 1 MHz from an unbalanced source onto a balanced electricity power distribution and/or transmission network and subsequent reception of the signal, wherein said source and said network are coupled by coupling means which include an impedance matching transformer to provide impedance matching therebetween, and wherein each transformer includes a primary and a secondary winding and the turns ratio between the primary and secondary winding being such as to provide an impedance match between the network and the source, with one of the primary and the secondary windings being operatively connected to the source and the other of the primary and secondary windings being operatively connected to two phase conductors of the network or one phase conductor and earth or neutral.

10. Communications apparatus for use with a balanced electricity distribution and/or power transmission network, said communications apparatus including a balanced low pass filter portion for allowing, in use, a low frequency high amplitude mains electricity power signal to pass through the apparatus, a balanced high pass filter portion for coupling HF signals having a carrier frequency of greater than 1 MHz onto the network, and impedance matching means including an impedance matching transformer for impedance matching between reception/transmission devices and the electricity power distribution and/or transmission network, wherein each transformer includes a primary and a secondary winding and the turns ratio between the primary and secondary winding being such as to provide an impedance match between the network and the source, with one of the primary and the secondary windings being operatively connected to the source and the other of the primary and secondary windings being operatively connected to two phase conductors of the network or one phase conductor and earth or neutral.

11. Communications apparatus according to claim 10 including means for connecting the apparatus to both a balanced and an unbalanced electricity distribution and/or transmission network, and allowing said low frequency high amplitude mains electricity signal to pass therebetween.

12. Communications apparatus according to claim 10 including means for connecting a balanced and an unbalanced HF signal to the network.

13. Communications apparatus according to claim 10 connected to an electricity power distribution and/or transmission network.

14. Communications apparatus according to claim 13 wherein said network is a balanced electricity and/or power transmission network.

15. A method of signal transmission including input of a telecommunications signal having a carrier frequency of at least 1 MHz from a telecommunications signal source onto a section of balanced electricity power distribution and/or transmission network and subsequent reception of the telecommunications signal by a reception device, wherein the section of balanced electricity power distribution and/or transmission network is substantially isolated at said carrier frequency from a source of electrical power by a balanced low pass filter passing a low frequency high amplitude mains electricity power signal from the source of electrical power to the section of the balanced electricity power distribution and/or transmission network, said telecommunications signal passing through a first balanced high pass filter coupling the telecommunications signal onto the section of balanced electricity power distribution and/or transmission network, and said telecommunications signal passing from said source of the telecommunications signal to said balanced high pass filter through at least one impedance matching transformer, said impedance matching transformer having a turns ratio between a primary winding and a secondary winding providing an impedance match between the source of the telecommunications signal and the section of balanced electricity power distribution and/or transmission network, wherein one of the primary and the secondary windings is operatively connected to the source of the telecommunications signal and the other of the primary and secondary windings is operatively connected to two phase conductors of the network or one phase conductor and earth or neutral.

16. A method according to claim 15, which includes passing said low frequency high amplitude mains electricity power signal through a power transformer, and bypassing said telecommunications signal around said power transformer through a high frequency bypass transformer having primary and secondary windings coupled through capacitors to primary and secondary windings of said power transformer.

17. A method of signal transmission including input of a telecommunications signal having a carrier frequency of at least 1 MHz from a telecommunications signal source onto a section of balanced electricity power distribution and/or transmission network and subsequent reception of the telecommunications signal by a reception device, wherein the section of balanced electricity power distribution and/or transmission network is substantially isolated at said carrier frequency from a source of electrical power by a balanced low pass filter passing a low frequency high amplitude mains electricity power signal from the source of electrical power to the section of the balanced electricity power distribution and/or transmission network, said telecommunications signal passing through a first balanced high pass filter coupling the telecommunications signal onto the section of balanced electricity power distribution and/or transmission network, and said telecommunications signal passing from said source of the telecommunications signal to said balanced high pass filter through at least one impedance matching transformer, said impedance matching transformer having a turns ratio between a primary winding and a secondary winding providing an impedance match between the source of the telecommunications signal and the section of balanced electricity power distribution and/or transmission network, wherein one of the primary and the secondary windings is operatively connected to the source of the telecommunications signal and the other of the primary and secondary windings is operatively connected to two phase conductors of the network or one phase conductor and earth or neutral, and which includes passing said low frequency high amplitude mains electricity power signal through an inductor from a phase conductor of said section of balanced electricity power distribution and/or transmission network to a section of unbalanced electricity power distribution and/or transmission network, and passing said telecommunications signal through a high-frequency transformer from said section of balanced electricity power distribution and/or transmission network to said section of unbalanced electricity power distribution and/or transmission network, said high-frequency transformer being coupled through capacitors to said balanced electricity power distribution and/or transmission network and to said section of unbalanced electricity power distribution and/or transmission network for passing said telecommunication signal and blocking said low frequency high amplitude mains electricity power signal.

18. Communication apparatus for coupling a balanced electricity power distribution and/or transmission network to a section of unbalanced electricity power distribution and/or transmission network powered by a single phase conductor of said balanced electricity power distribution and/or transmission network, said communications apparatus including:

- an inductor connecting said single phase conductor to said section of unbalanced electricity power distribution and/or transmission network for passing a low frequency high amplitude mains electricity power signal from the single phase conductor of said section of balanced electricity power distribution and/or transmission network to said section of unbalanced electricity power distribution and/or transmission network;
- a high-frequency transformer having a first winding and a second winding for coupling a telecommunications signal between said first winding and said second winding;
- a first capacitor connected in series with said first winding to said balanced electricity power distribution and/or transmission network for passing said telecommunications signal and blocking said low frequency high amplitude mains electricity power signal; and
- a second capacitor connected in series with said second winding to said unbalanced electricity power distribution and/or transmission network for passing said telecommunications signal and blocking said low frequency high amplitude mains electricity power signal.

19. Communications apparatus as claimed in claim 18, further including a first fuse connected in series with said first capacitor, and a second fuse connected in series with said second capacitor.

20. Communications apparatus as claimed in claim 18, wherein a first end of said second winding is connected through said second capacitor to a first phase conductor of said balanced electricity power distribution and/or transmission network, and a second end of said second winding is connected through a third capacitor to a second phase conductor of said balanced electricity power distribution and/or transmission network.

21. Communications apparatus as claimed in claim 20, further including a first fuse connected in series with said first capacitor, a second fuse connected in series with said second capacitor between said first end of said second winding and said first phase conductor, and a third fuse connected in series with said third capacitor between said second end of said second winding and said second phase conductor.

* * * * *